United States Patent
Yu et al.

(10) Patent No.: US 12,126,015 B2
(45) Date of Patent: Oct. 22, 2024

(54) LAYERED SODIUM ION BATTERY POSITIVE ELECTRODE MATERIAL AND PREPARATION METHOD THEREFOR

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/553,067

(22) PCT Filed: Apr. 29, 2022

(86) PCT No.: PCT/CN2022/090533
§ 371 (c)(1),
(2) Date: Sep. 28, 2023

(87) PCT Pub. No.: WO2023/040285
PCT Pub. Date: Mar. 23, 2023

(65) Prior Publication Data
US 2024/0088374 A1    Mar. 14, 2024

(30) Foreign Application Priority Data

Sep. 15, 2021   (CN) .......................... 202111082327.4

(51) Int. Cl.
*H01M 4/485*   (2010.01)
*H01M 4/36*    (2006.01)
(Continued)

(52) U.S. Cl.
CPC .......... *H01M 4/485* (2013.01); *H01M 4/366* (2013.01); *H01M 4/505* (2013.01); *H01M 10/0525* (2013.01); *H01M 2004/028* (2013.01)

(58) Field of Classification Search
None
See application file for complete search history.

(56) References Cited

FOREIGN PATENT DOCUMENTS

| CN | 106673065 A | 5/2017 |
| CN | 106848288 A | 6/2017 |

(Continued)

OTHER PUBLICATIONS

International Search Report for PCT/CN2022/090533 mailed Jul. 18, 2022, ISA/CN.
(Continued)

*Primary Examiner* — Zhongqing Wei
(74) *Attorney, Agent, or Firm* — Yue (Robert) Xu; Apex Attorneys at Law, LLP

(57) ABSTRACT

A layered sodium ion battery positive electrode material and a preparation method therefor. The chemical formula of the layered sodium ion battery positive electrode material is $Na_xMnO_{2-a}(MO_4)_a$, wherein $0<x\leq1$, $0.01\leq a\leq 0.2$, and M is one or two of W and Mo. The preparation method comprises: preparing a manganese salt solution and a basic potassium permanganate solution mixed with an M element material, wherein the M element material is one or two of (Continued)

molybdate or tungstate; adding the basic potassium permanganate solution to the manganese salt solution, and potassium permanganate solution to the manganese salt solution, and after a reaction is finished, carrying out solid-liquid separation to obtain a solid material; and washing and drying the solid material, mixing the solid material with a sodium source, and then sintering same to obtain a layered sodium ion battery positive electrode material. The layered sodium ion battery positive electrode material of the present invention enhances the framework structure of the material due to the doping of the tungsten or molybdenum element, inhibits the phase change of the material during the charging and discharging process, and can significantly improve the specific capacity, the cycle performance and the rate capability of the material.

13 Claims, 1 Drawing Sheet

(51) Int. Cl.
*H01M 4/505* (2010.01)
*H01M 10/0525* (2010.01)
*H01M 4/02* (2006.01)

(56) References Cited

FOREIGN PATENT DOCUMENTS

| | | |
|---|---|---|
| CN | 106898758 A | 6/2017 |
| CN | 109449418 A | 3/2019 |
| CN | 111554920 A | 8/2020 |
| CN | 112234201 A | 1/2021 |
| CN | 113964300 A | 1/2022 |
| JP | 2013175311 A | 9/2013 |
| KR | 102130528 B1 | 7/2020 |

OTHER PUBLICATIONS

The Moroccan 1st Office Action issued on Aug. 5, 2024 for MA61738.

Yunming, Li et al. Recent advances of electrode materials for low-cost sodium-ion batteries towards practical application for grid energy storage. Energy Storage Materials, Mar. 1, 2017 [en línea][recuperado el Jun. 20, 2024]. Recuperado de Internet <URL:https://www.sciencedirect.com/science/article/pii/S2405829716303154>, <DOI: 10.1016/j.ensm.2017.01.002>. Apartados 1, 2.1.1, 2.1.2; figura 6.

The Spanish 1st Office Action issued on Jun. 21, 2024 for P202390122.

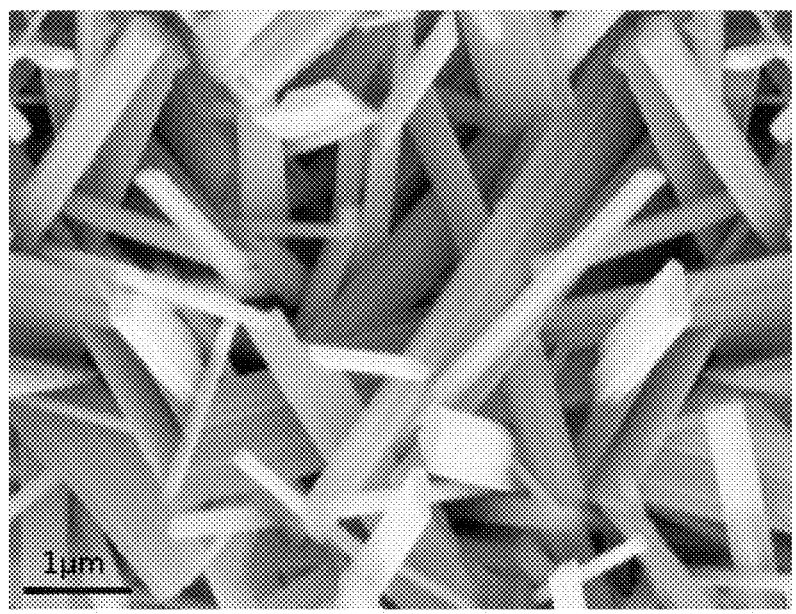

LAYERED SODIUM ION BATTERY POSITIVE ELECTRODE MATERIAL AND PREPARATION METHOD THEREFOR

This is a US National Phase application based upon PCT Application No. PCT/CN2022/090533 filed on Apr. 29, 2022, which claims the priority of Chinese Patent application Ser. No. 202111082327.4 filed on Sep. 15, 2021 and titled with "LAYERED SODIUM ION BATTERY POSITIVE ELECTRODE MATERIAL AND PREPARATION METHOD THEREFOR", and the disclosures of which are hereby incorporated by reference.

FIELD

The present invention belongs to the technical field of sodium ion batteries, and specifically relates to a positive electrode material for layered sodium ion battery and a preparation method thereof.

BACKGROUND

Electrochemical energy storage has a long history. Flow batteries, sodium-sulfur batteries, nickel-hydrogen batteries, and lithium-ion batteries are batteries with more mature technology development. Lithium ion batteries have many advantages, such as high energy density, long cycle life, high working voltage, no memory effect, small self-discharge, and wide working temperature range, and are developing rapidly. However, the content of lithium in crust and seawater is low, and the content in the crust is only $20 \times 10^{-6}$. With the commercial use of lithium ion batteries, the price of lithium resources has begun to rise. Compared with lithium resources, sodium reserves are very rich, accounting for about 2.64% of the crustal reserves, and widely distributed with a simple extraction. Besides, since sodium and lithium are in the same main group of the periodic table, they have similar physical and chemical properties.

The sodium ion battery has the same principle and structure as the lithium ion battery, both composed of positive electrode material, a negative electrode material, an electrolyte, and a separator. During charging and discharging of the battery, $Na^+$ is intercalated and deintercalated back and forth between the two electrodes: when the battery is charged, $Na^+$ is deintercalated from the positive electrode and intercalated via the electrolyte into the negative electrode, which is in a sodium-rich state.

The electrode materials for sodium ion battery mainly include positive electrode materials such as layered $Na_xMO_2$ (M=Co, Ni, Fe, Mn, and V, etc.) materials, polyanionic materials, and metal fluoride. Layered $Na_xMO_2$ materials are widely used in sodium ion batteries due to their high specific capacity and low toxicity. Due to the abundance in the earth, non-toxicity, and high specific capacity of Mn, the technical research on sodium manganite-based positive electrode materials has become a hot spot.

The layered transition metal oxide $NaMnO_2$ is the earliest researched type of positive electrode material for sodium ion batteries, which has the advantages of high energy density, high specific capacity, high electronic conductivity, and simple preparation method, etc. However, such materials are extremely unstable in the air during the practical application, which leads to the increase of cost in the process of material synthesis, transportation, and battery assembly. In addition, due to the large difference between the radius of sodium ion and the radius of transition metal, layered oxides are prone to problems of interphase structural changes during charging and discharging, which results in poor structural stability and electrochemical cycle performance of positive electrode materials, and greatly limits the large-scale application of such positive electrode materials.

SUMMARY

The present invention intends to solve at least one of the above-mentioned technical problems existing in the prior art. To this end, the present invention provides a positive electrode material for layered sodium ion battery and a preparation method thereof, which can improve the structural stability and long-cycle performance of the positive electrode material for sodium ion battery such as $NaMnO_2$.

According to one aspect of the present invention, a positive electrode material for layered sodium ion batteries is provided. The positive electrode material for layered sodium ion battery has a chemical formula of $Na_xMnO_{2-a}(MO_4)_a$, wherein $0<x\leq1$, $0.01\leq a\leq0.2$, and M is one or both of W and Mo.

The present invention also provides a method for preparing the positive electrode material for layered sodium ion battery, comprising steps of:

S1: preparing a manganese salt solution and an alkaline potassium permanganate solution mixed with an M element material, wherein the M element material is one or both of molybdate and tungstate;

S2: adding the alkaline potassium permanganate solution to the manganese salt solution, and performing solid-liquid separation after the reaction is finished to obtain a solid material;

S3: after washing and drying the solid material, mix the solid material with a sodium source and then sinter to obtain a positive electrode material for layered sodium ion battery.

In some embodiments of the present invention, in step S1, the molybdate is selected from one or more ammonium molybdate, sodium molybdate, and potassium molybdate; and the tungstate is selected from one or more of ammonium tungstate, sodium tungstate, and potassium tungstate.

In some embodiments of the present invention, in step S1, a concentration of M element in the alkaline potassium permanganate solution is 0.025-0.5 times of a concentration of permanganate ion.

In some embodiments of the present invention, in step S1, a concentration of permanganate ion in the alkaline potassium permanganate solution is 0.1-0.4 mol/L, and a concentration of hydroxide ion is 2±0.2 times of a concentration of permanganate ion.

In some embodiments of the present invention, in step S1, the manganese salt solution is one or more of manganese sulfate, manganese chloride, and manganese nitrate; preferably, a concentration of manganese ion in the manganese salt solution is 0.1-2.0 mol/L.

In some embodiments of the present invention, in step S2, the alkaline potassium permanganate solution is added in a continuous flow; preferably, a temperature of the reaction is 40-90° C.

In some embodiments of the present invention, in step S3, the sodium source is one or more sodium carbonate, sodium oxalate, sodium acetate, sodium hydroxide and sodium peroxide.

In some embodiments of the present invention, in step S3, a molar ratio of sodium atom in the sodium source to manganese atom in the solid material is x: 1, $0<x\leq1$.

In some embodiments of the present invention, in step S3, a temperature of the sintering is 700-1120° C.; preferably, a duration of the sintering is 12-24 hours.

According to a preferred embodiment of the present invention, there are at least the following advantages:

1. Due to being doped with tungsten or molybdenum element, the positive electrode material for layered sodium ion battery of the present invention enhances the skeleton structure of the material, inhibits the phase change of the material during charging and discharging, and can significantly improve the specific capacity, cycle performance and rate capability of the material;

2. In the present invention, by adding an alkaline potassium permanganate solution mixed with an M element material to a manganese salt solution, a λ-type $MnO_2$ material doped with molybdenum or tungsten is prepared, and the reaction equation is as follows:

$$2MnO_4^- + 3Mn^{2+} + 4OH^+ = MnO_2\downarrow + 2H_2O$$

$$MO_4^{2-} + Mn^{2+} = MnMO_4\downarrow$$

It is easy to prepare layered sodium manganite-based positive electrode material by sintering this material with sodium source.

3. In the present invention, the positive electrode material for sodium ion battery is prepared in two steps. Firstly, a precursor manganese dioxide material matrix of the material is prepared by reacting potassium permanganate with a manganese salt. During the preparation process, a doping element molybdenum or tungsten reacts with manganese ion together with potassium permanganate to achieve co-precipitation, ensuring the homogeneity of the doping element of the material and achieving atomic mixing between the elements. The introduction of the doping element further stabilizes the internal structure, which overcomes the problems of uneven doping of elements and easy collapse of crystal lattice during solid phase sintering in the prior art, and further improves the specific capacity, cycle performance and rate capability of the positive electrode material for sodium ion battery.

BRIEF DESCRIPTION OF DRAWINGS

The present disclosure is further described below in conjunction with the drawings and embodiments, in which:

FIG. 1 is an SEM image of the positive electrode material for layered sodium ion battery in Example 1 of the present invention.

DETAILED DESCRIPTION

Hereinafter, the concept of the present invention and the technical effects produced by the present disclosure will be described clearly and completely in conjunction with the embodiments, so as to fully understand the purpose, features and effects of the present invention. It is apparent that the described embodiments are only a part of the embodiments of the present invention, rather than all of them. All the other embodiments obtained by those skilled in the art based on the embodiments of the present invention without any creative work fall into the scope of the present invention.

Example 1

In this example, a positive electrode material for layered sodium ion battery which has a chemical formula of $Na_{0.44}MnO_{1.99}(MoO_4)_{0.01}$ was prepared, and the specific process was as follows:

(1) A manganese sulphate solution with a concentration of 0.1 mol/L and an alkaline potassium permanganate solution mixed with sodium molybdate were prepared. In the alkaline potassium permanganate solution, the concentration of permanganate ion was 0.1 mol/L, and the concentration of hydroxide ion was twice of the concentration of permanganate ion. In the alkaline potassium permanganate solution, the concentration of molybdenum was 0.025 times of the concentration of permanganate ion;

(2) The alkaline potassium permanganate solution mixed with sodium molybdate was added to the manganese salt solution. The alkaline potassium permanganate solution mixed with sodium molybdate was added in a continuous flow, and the temperature of the reaction system was controlled to 50° C. After the reaction was finished, solid-liquid separation was performed to obtain a solid material;

(3) After washed and dried, the solid material was mixed with sodium carbonate in a molar ratio of sodium atom to manganese atom of 0.44:1, maintained at 1100° C. for 24 hours, and rapidly taken out and quenched after the reaction was finished to obtain a positive electrode material for layered sodium ion battery.

FIG. 1 is an SEM image of the positive electrode material for layered sodium ion battery in this example. From the FIGURE, it can be seen that the positive electrode material for sodium ion battery was in strip shape.

The positive electrode material for layered sodium ion battery prepared in this example was assembled into a sodium ion half-cell, which had a voltage range of 2.0-3.8 V at 0.8 C rate, an initial specific capacity of up to 138.4 mAh/g, a specific capacity of 135.1 mAh/g after 100 charge and discharge cycles, and a capacity retention rate of 97.61%.

Example 2

In this example, a positive electrode material for layered sodium ion battery which has a chemical formula of $Na_{0.67}MnO_{1.9}(WO_4)_{0.1}$ was prepared, and the specific process was as follows:

(1) A manganese chloride solution with a concentration of 1.0 mol/L and an alkaline potassium permanganate solution mixed with sodium tungstate were prepared. In the alkaline potassium permanganate solution, the concentration of permanganate ion was 0.2 mol/L, and the concentration of hydroxide ion was twice of the concentration of permanganate ion. In the alkaline potassium permanganate solution, the concentration of tungsten was 0.25 times of the concentration of permanganate ion;

(2) The alkaline potassium permanganate solution mixed with sodium tungstate was added to the manganese salt solution. The alkaline potassium permanganate solution mixed with sodium tungstate was added in a continuous flow, and the temperature of the reaction system was controlled to 80° C. After the reaction was finished, solid-liquid separation was performed to obtain a solid material;

(3) After washed and dried, the solid material was mixed with sodium oxalate in a molar ratio of sodium atom to manganese atom of 0.67:1, maintained at 800° C. for 14 hours, and rapidly taken out and quenched after the reaction was finished to obtain a positive electrode material for layered sodium ion battery.

The positive electrode material for layered sodium ion battery prepared in this example was assembled into a sodium ion half-cell, which had a voltage range of 2.0-3.8 V at 0.5 C rate, an initial specific capacity of up to 145.1 mAh/g, a specific capacity of 115.3 mAh/g after 300 charge and discharge cycles, and a capacity retention rate of 79.46%.

Example 3

In this example, a positive electrode material for layered sodium ion battery which has a chemical formula of $Na_{0.74}MnO_{1.8}(WO_4)_{0.2}$ was prepared, and the specific process was as follows:

(1) A manganese nitrate solution with a concentration of 2.0 mol/L and an alkaline potassium permanganate solution mixed with potassium tungstate were prepared. In the alkaline potassium permanganate solution, the concentration of permanganate ion was 0.3 mol/L, and the concentration of hydroxide ion was twice of the concentration of permanganate ion. In the alkaline potassium permanganate solution, the concentration of tungsten was 0.5 times of the concentration of permanganate ion;

(2) The alkaline potassium permanganate solution mixed with potassium tungstate was added to the manganese salt solution. The alkaline potassium permanganate solution mixed with potassium tungstate was added in a continuous flow, and the temperature of the reaction system was controlled to 70° C. After the reaction was finished, solid-liquid separation was performed to obtain a solid material;

(3) After washed and dried, the solid material was mixed with sodium acetate in a molar ratio of sodium atom to manganese atom of 0.74:1, maintained at 900° C. for 20 hours, and rapidly taken out and quenched after the reaction was finished to obtain a positive electrode material for layered sodium ion battery.

The positive electrode material for layered sodium ion battery prepared in this example was assembled into a sodium ion half-cell, which had a voltage range of 2.0-3.8 V at 0.5 C rate, an initial specific capacity of up to 148.5 mAh/g, a specific capacity of 119.9 mAh/g after 300 charge and discharge cycles, and a capacity retention rate of 80.74%.

Example 4

In this example, a positive electrode material for layered sodium ion battery which has a chemical formula of $NaMnO_{1.8}(MoO_4)_{0.2}$ was prepared, and the specific process was as follows:

(1) A manganese sulfate solution with a concentration of 0.3 mol/L and an alkaline potassium permanganate solution mixed with potassium molybdate were prepared. In the alkaline potassium permanganate solution, the concentration of permanganate ion was 0.2 mol/L, and the concentration of hydroxide ion was twice of the concentration of permanganate ion. In the alkaline potassium permanganate solution, the concentration of molybdenum was 0.5 times of the concentration of permanganate ion;

(2) The alkaline potassium permanganate solution mixed with potassium molybdate was added to the manganese salt solution. The alkaline potassium permanganate solution mixed with potassium molybdate was added in a continuous flow, and the temperature of the reaction system was controlled to 90° C. After the reaction was finished, solid-liquid separation was performed to obtain a solid material;

(3) After washed and dried, the solid material was mixed with sodium hydroxide in a molar ratio of sodium atom to manganese atom of 1:1, maintained at 1000° C. for 22 hours, and rapidly taken out and quenched after the reaction was finished to obtain a positive electrode material for layered sodium ion battery.

The positive electrode material for layered sodium ion battery prepared in this example was assembled into a sodium ion half-cell, which had a voltage range of 2.0-3.8 V at 0.8 C rate, an initial specific capacity of up to 148.4 mAh/g, a specific capacity of 136.3 mAh/g after 100 charge and discharge cycles, and a capacity retention rate of 91.85%.

Example 5

In this example, a positive electrode material for layered sodium ion battery which has a chemical formula of $Na_{0.5}MnO_{1.9}(WO_4)_{0.1}$ was prepared, and the specific process was as follows:

(1) A manganese nitrate solution with a concentration of 1.5 mol/L and an alkaline potassium permanganate solution mixed with ammonium tungstate were prepared. In the alkaline potassium permanganate solution, the concentration of permanganate ion was 0.1-0.4 mol/L, and the concentration of hydroxide ion was twice of the concentration of permanganate ion. In the alkaline potassium permanganate solution, the concentration of tungsten was 0.25 times of the concentration of permanganate ion;

(2) The alkaline potassium permanganate solution mixed with ammonium tungstate was added to the manganese salt solution. The alkaline potassium permanganate solution mixed with ammonium tungstate was added in a continuous flow, and the temperature of the reaction system was controlled to 40° C. After the reaction was finished, solid-liquid separation was performed to obtain a solid material;

(3) After washed and dried, the solid material was mixed with sodium peroxide in a molar ratio of sodium atom to manganese atom of 0.5:1, maintained at 750° C. for 18 hours, and rapidly taken out and quenched after the reaction was finished to obtain a positive electrode material for layered sodium ion battery.

The positive electrode material for layered sodium ion battery prepared in this example was assembled into a sodium ion half-cell, which had a voltage range of 2.0-3.8 V at 0.8 C rate, an initial specific capacity of up to 142.8 mAh/g, a specific capacity of 139.4 mAh/g after 100 charge and discharge cycles, and a capacity retention rate of 97.62%.

Example 6

In this example, a positive electrode material for layered sodium ion battery which has a chemical formula of $Na_{0.67}MnO_{1.8}(WO_4 \cdot MoO_4)_{0.2}$ was prepared, and the specific process was as follows:

(1) A manganese chloride solution with a concentration of 0.5 mol/L and an alkaline potassium permanganate solution mixed with potassium tungstate and potassium molybdate were prepared. In the alkaline potassium permanganate solution, the concentration of permanganate ion was 0.2 mol/L, and the concentration of hydroxide ion was twice of the concentration of permanganate ion. In the alkaline potassium permanganate solution, the total concentration of tungsten and molybdenum was 0.5 times of the concentration of permanganate ion, and the molar ratio of tungsten to molybdenum was 1:1;

(2) The alkaline potassium permanganate solution mixed with potassium tungstate and potassium molybdate was added to the manganese salt solution. The alkaline potassium permanganate solution mixed with potassium tungstate and potassium molybdate was added in a continuous flow, and the temperature of the reaction system was controlled to 60° C. After the reaction was finished, solid-liquid separation was performed to obtain a solid material;

(3) After washed and dried, the solid material was mixed with sodium oxalate in a molar ratio of sodium atom to manganese atom of 0.67:1, maintained at 800° C. for 16 hours, and rapidly taken out and quenched after the reaction was finished to obtain a positive electrode material for layered sodium ion battery.

The positive electrode material for layered sodium ion battery prepared in this example was assembled into a sodium ion half-cell, which had a voltage range of 2.0-3.8 V at 0.5 C rate, an initial specific capacity of up to 146.7 mAh/g, a specific capacity of 118.6 mAh/g after 300 charge and discharge cycles, and a capacity retention rate of 80.85%.

The embodiments of the present disclosure have been described in detail above in conjunction with the drawings. However, the present disclosure is not limited to the above-mentioned embodiments, and various modifications can be made without departing from the purpose of the present disclosure within the scope of knowledge possessed by those of ordinary skill in the art. In addition, in the case of no conflict, the embodiments of the present disclosure and the features in the embodiments may be combined with each other.

The invention claimed is:

1. A positive electrode material for layered sodium ion battery, which has a chemical formula of $Na_xMnO_{2-a}(MO_4)_a$, wherein $0<x\leq1$, $0.01\leq a\leq 0.2$, and M is one or both of W and Mo.

2. A method for preparing the positive electrode material for layered sodium ion battery according to claim 1, comprising steps of:
   S1: preparing a manganese salt solution and an alkaline potassium permanganate solution mixed with an M element material, wherein the M element material is one or both of molybdate and tungstate;
   S2: adding the alkaline potassium permanganate solution to the manganese salt solution, and performing solid-liquid separation after the reaction is finished to obtain a solid material;
   S3: after washing and drying the solid material, mixing the solid material with a sodium source and then sintering to obtain a positive electrode material for layered sodium ion battery.

3. The method according to claim 2, wherein in step S1, the molybdate is selected from one or more of ammonium molybdate, sodium molybdate and potassium molybdate; and the tungstate is selected from one or more of ammonium tungstate, sodium tungstate and potassium tungstate.

4. The method according to claim 2, wherein in step S1, a molar concentration of M element in the alkaline potassium permanganate solution is 0.025-0.5 times of a molar concentration of permanganate ion.

5. The method according to claim 2, wherein in step S1, a concentration of permanganate ion in the alkaline potassium permanganate solution is 0.1-0.4 mol/L, and a molar concentration of hydroxide ion is 2±0.2 times of a molar concentration of permanganate ion.

6. The method according to claim 2, wherein in step S1, the manganese salt solution is one or more of manganese sulfate, manganese chloride and manganese nitrate.

7. The method according to claim 2, wherein in step S2, the alkaline potassium permanganate solution is added in a continuous flow.

8. The method according to claim 2, wherein in step S3, the sodium source is one or more of sodium carbonate, sodium oxalate, sodium acetate, sodium hydroxide and sodium peroxide.

9. The method according to claim 2, wherein in step S3, a molar ratio of sodium atom in the sodium source to manganese atom in the solid material is x: 1, wherein $0<x\leq1$.

10. The method according to claim 2, wherein in step S3, a temperature of the sintering is 700-1120° C.

11. The method according to claim 2, wherein in step S1, a concentration of manganese ion in the manganese salt solution is 0.1-2.0 mol/L.

12. The method according to claim 2, wherein in step S2, a temperature of the reaction is 40-90° C.

13. The method according to claim 2, wherein in step S3, a duration of the sintering is 12-24 hours.

* * * * *